US012690509B2

(12) United States Patent
Goering

(10) Patent No.: US 12,690,509 B2
(45) Date of Patent: Jul. 28, 2026

(54) AUTOMATED RAISING AND LOWERING OF IMPLEMENT FOR FARMING MACHINE

(71) Applicant: Deere & Company, Moline, IL (US)

(72) Inventor: Kevin J. Goering, Cambridge, IA (US)

(73) Assignee: Deere & Company, Moline, IL (US)

( * ) Notice: Subject to any disclaimer, the term of this patent is extended or adjusted under 35 U.S.C. 154(b) by 1101 days.

(21) Appl. No.: 17/591,088

(22) Filed: Feb. 2, 2022

(65) Prior Publication Data

US 2023/0240170 A1     Aug. 3, 2023

(51) Int. Cl.
   A01B 63/00     (2006.01)
   A01B 63/14     (2006.01)
(52) U.S. Cl.
   CPC .................................... A01B 63/14 (2013.01)
(58) Field of Classification Search
   None
   See application file for complete search history.

(56) References Cited

U.S. PATENT DOCUMENTS

| | | | | |
|---|---|---|---|---|
| 10,827,665 | B2 * | 11/2020 | Sporrer | A01B 63/008 |
| 2002/0170723 | A1 * | 11/2002 | Krone | A01B 63/106 |
| | | | | 172/452 |
| 2006/0108127 | A1 * | 5/2006 | Batthala | A01B 63/1117 |
| | | | | 172/2 |

| | | | | |
|---|---|---|---|---|
| 2017/0311541 | A1 | 11/2017 | Pankaj et al. | |
| 2018/0077850 | A1 * | 3/2018 | Henry | A01B 79/005 |
| 2020/0029485 | A1 * | 1/2020 | Glennon | A01B 63/32 |
| 2020/0323142 | A1 * | 10/2020 | Riedel | A01D 78/1085 |
| 2020/0337204 | A1 * | 10/2020 | Hertzog | A01B 15/14 |
| 2020/0383261 | A1 * | 12/2020 | Miyashita | G05D 1/027 |

FOREIGN PATENT DOCUMENTS

| | | |
|---|---|---|
| JP | 2007-006752 A | 1/2007 |
| JP | 2009-148229 A | 7/2009 |
| JP | 2016-054648 A | 4/2016 |

OTHER PUBLICATIONS

Extended European Search Report and Written Opinion issued in European Patent Application No. 23151140.3, dated Jul. 3, 2023, in 07 pages.

* cited by examiner

*Primary Examiner* — Truc M Do
(74) *Attorney, Agent, or Firm* — Fenwick & West LLP

(57)     ABSTRACT

A farming vehicle is configured to automatically raise and lower an implement for the farming vehicle. The farming vehicle may measure a duration to lower the implement during a calibration period or during the first time the farming vehicle lowers the implement to operate on a field. When entering the headland to turn around between rows, the farming vehicle may raise the implement after determining that the entire implement is located within the headland. Based on the determined amount of time to lower the implement, the farming vehicle may begin lowering the implement with sufficient time such that the implement is fully lowered just prior to exiting the headland and returning onto the field.

17 Claims, 10 Drawing Sheets

100

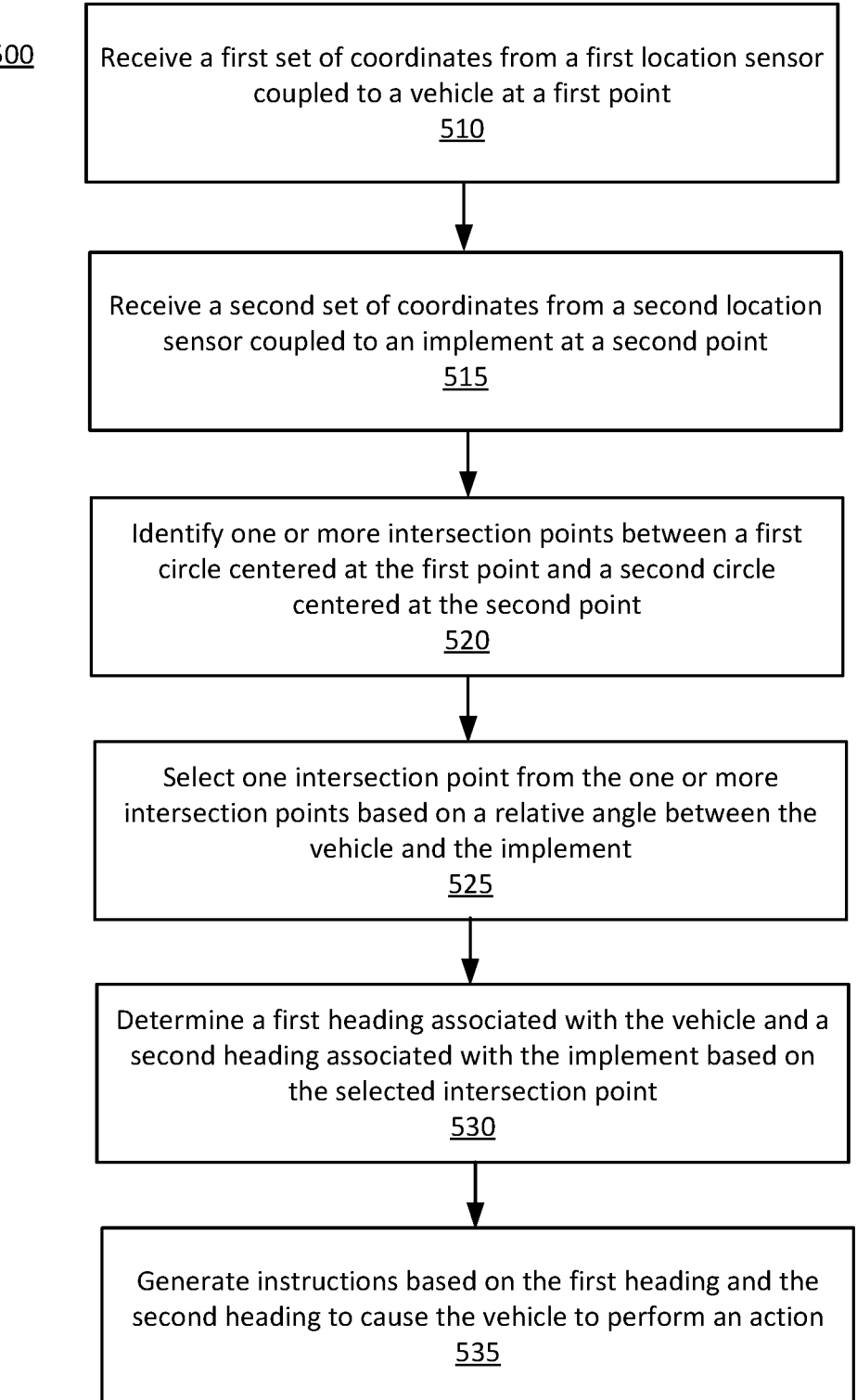

500

Receive a first set of coordinates from a first location sensor coupled to a vehicle at a first point
510

Receive a second set of coordinates from a second location sensor coupled to an implement at a second point
515

Identify one or more intersection points between a first circle centered at the first point and a second circle centered at the second point
520

Select one intersection point from the one or more intersection points based on a relative angle between the vehicle and the implement
525

Determine a first heading associated with the vehicle and a second heading associated with the implement based on the selected intersection point
530

Generate instructions based on the first heading and the second heading to cause the vehicle to perform an action
535

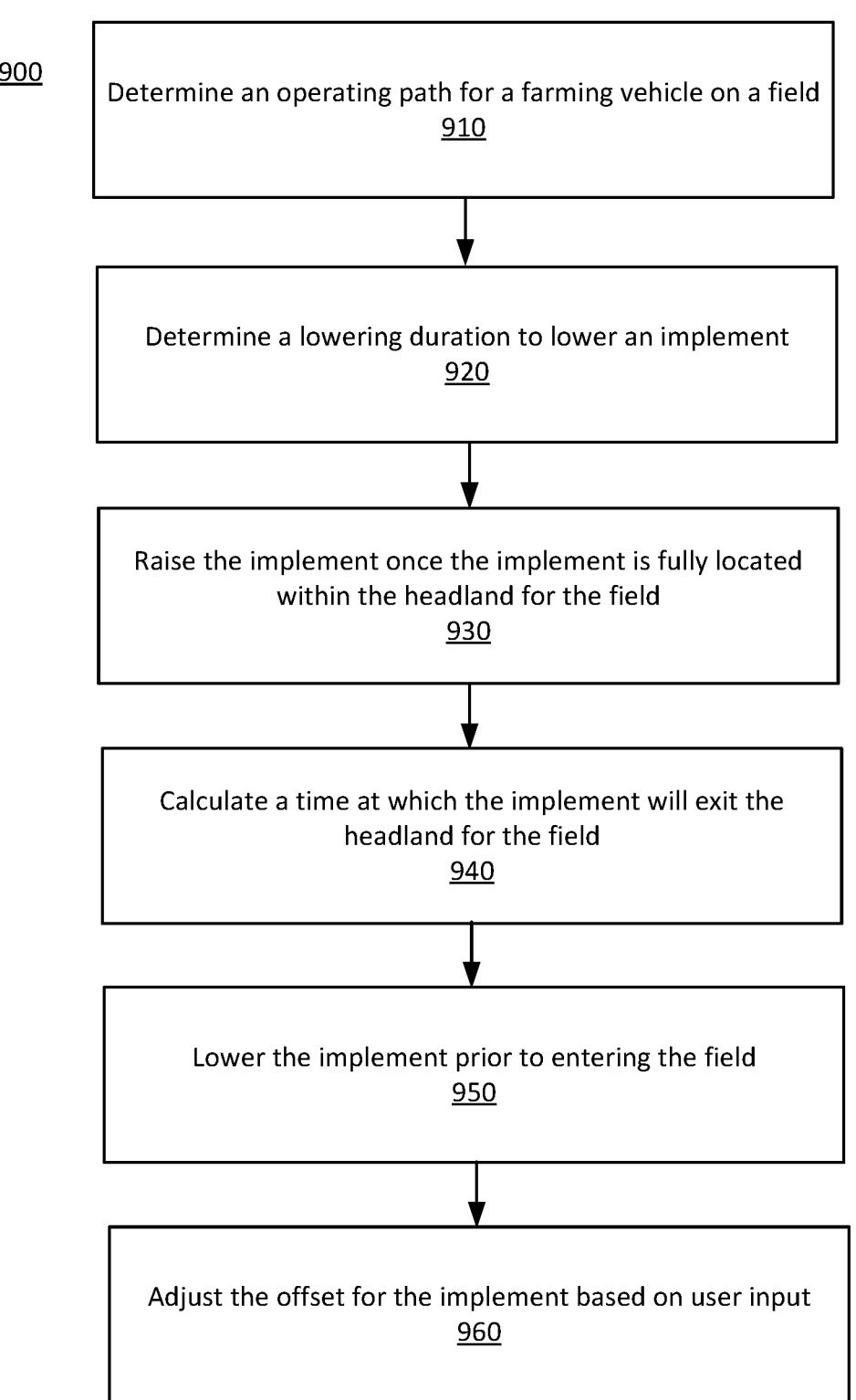

900

Determine an operating path for a farming vehicle on a field
910

Determine a lowering duration to lower an implement
920

Raise the implement once the implement is fully located within the headland for the field
930

Calculate a time at which the implement will exit the headland for the field
940

Lower the implement prior to entering the field
950

Adjust the offset for the implement based on user input
960

FIG. 9

AUTOMATED RAISING AND LOWERING OF IMPLEMENT FOR FARMING MACHINE

TECHNICAL FIELD

The disclosure generally relates to the field of autonomous vehicles, and more particularly relates to the timing of raising and lowering implements for farming machines.

BACKGROUND

A farming machine may include a vehicle coupled to an implement, and the vehicle pushes or pulls the implement to perform various farming operations (e.g., tilling, planting seeds, treating plants). Typically, the farming vehicle has a location sensor (e.g., global positioning system sensor) that determines the location of the farming vehicle. As the farming vehicle moves, the location sensor collects location data and a heading (e.g., an orientation of the farming machine) of the farming vehicle is calculated based on changes in location data corresponding to the motion of the farming vehicle. The farming vehicle turns around after completing a row in an area referred to as a headland. It is typically undesirable for the implement to be in contact with the ground in the headland, so the farming vehicle raises the implement when entering the headland and lowers the implement when exiting the headland. Raising and lowering the implement is not an instantaneous process. If the farming vehicle raises the implement too early prior to entering the headland, a portion of the field may not be operated on by the implement. If the farming vehicle raises the implement too late, the implement may unnecessarily operate on the ground in a portion of the headland, which may result in unnecessary cost, time, or damage to the implement or headland.

SUMMARY

Systems and methods are disclosed herein that address the above-described problems related to automatically raising and lowering an implement for a farming vehicle. The farming vehicle may determine an amount of time required to lower the implement. The farming vehicle may measure the amount of time it takes to lower the implement during a calibration period or during the first time the farming vehicle lowers the implement to operate on a field. When entering the headland to turn around between passes, the farming vehicle may raise the implement after determining that the entire implement is located within the headland. Based on the determined amount of time to lower the implement, the farming vehicle may begin lowering the implement with sufficient time such that the implement is fully lowered just prior to exiting the headland and returning onto the field.

In some embodiments, a farming vehicle may determine an operating path for the farming vehicle on a field. The farming vehicle may determine a lowering duration to lower an implement of the farming vehicle. The farming vehicle may raise the implement in response to the implement being fully located within a headland for the field. The farming machine may calculate a time at which the implement will exit the headland and enter the field based on the determined operating path for the farming vehicle. When the calculated time is equal to or within a threshold time of the determined lowering duration, the farming vehicle may lower the implement prior to entering the field.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates a block diagram of a system environment for a farming machine management system, according to an embodiment.

FIG. 5 illustrates a flowchart of a method for determining heading of a farming vehicle and an implement, according to an embodiment.

FIG. 9 illustrates a flowchart of a method for automatically raising and lowering an implement for a farming vehicle, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
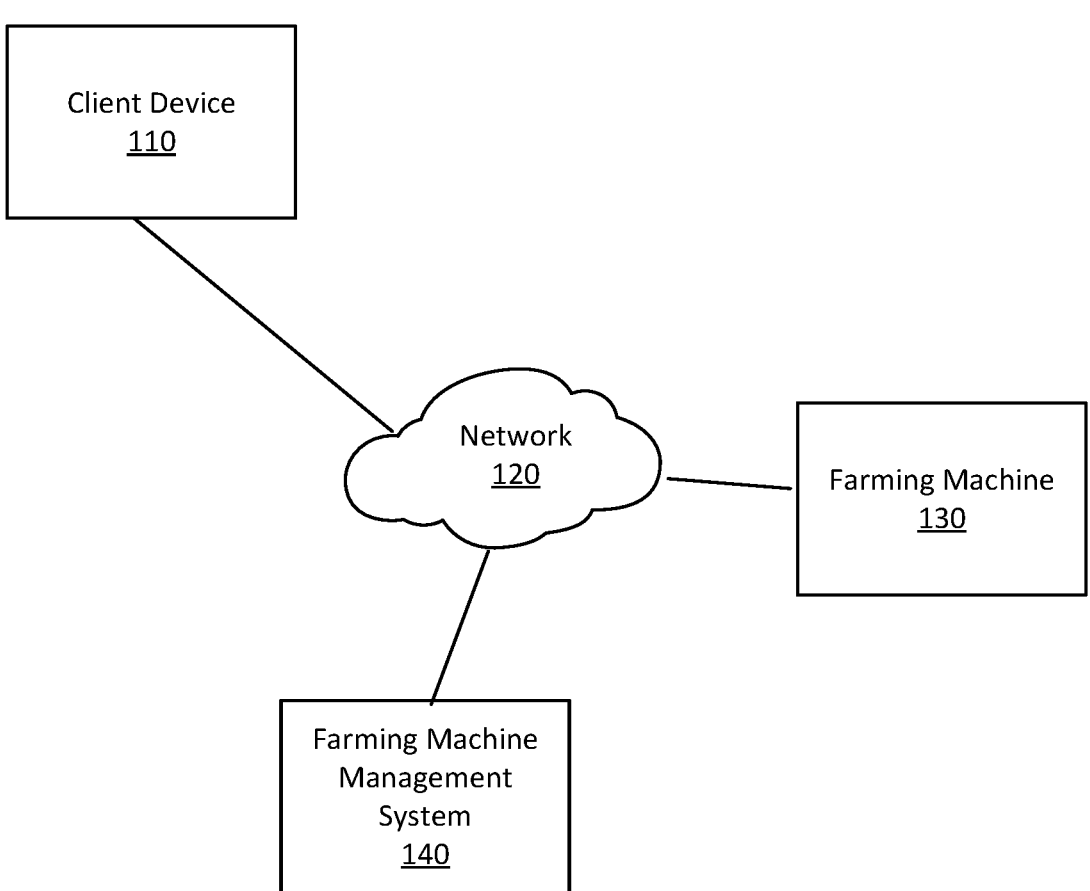

Figure (FIG. 1 illustrates a block diagram of a system environment 100 for a farming machine management system, according to an embodiment. The system environment 100 includes a client device 110, a network 120, a farming machine 130, and a farming machine management system 140. The system environment 100 may have alternative configurations than shown in FIG. 1 and include different, fewer, or additional components.

The client device 110 is a device used by a user to operate the farming machine 130. For example, the user may be an employee associated with the farming management system 140, a third party individual, or an individual associated with a field where the farming machine 130 is being used (e.g., a farmer that owns the field). The farming machine 130 may be controlled remotely based on inputs from the client device 110 or operate semi-autonomously based on inputs describing the tasks to be performed by the farming machine 130 such as types of tasks, time at which the tasks are to be performed, portions of the field in which the tasks are to be performed, and other information for operating the farming machine 130. In other embodiments, the farming machine 130 may be autonomous and operate without input from the user. The client device 110 is configured to communicate with the farming machine 130 and/or the farming machine management system 140 via the network 120, for example using a native application executed by the computing device and provides functionality of the farming machine management system 140, or through an application programming interface (API) running on a native operating system of the computing device, such as IOS® or ANDROID™. The client device 110 may be a conventional computer system, such as a desktop or a laptop computer. Alternatively, the client device 110 may be a device having computer functionality, such as a personal digital assistant (PDA), a mobile telephone, a smartphone, or another suitable device. The client device 110 may be integrated with the farming machine 130 (e.g., a console within the farming machine 130). The client device 110 include the hardware and software needed to input and output sound (e.g., speakers and microphone) and images, connect to the network 120 (e.g., via Wifi and/or 4G or other wireless telecommunication standards), determine the current geographic location of the client device 110 (e.g., a Global Positioning System (GPS) unit), and/or detect motion of the client device 110 (e.g., via motion sensors such as accelerometers and gyroscopes).

The client device 110 is configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as a control area network (CAN), Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 3:
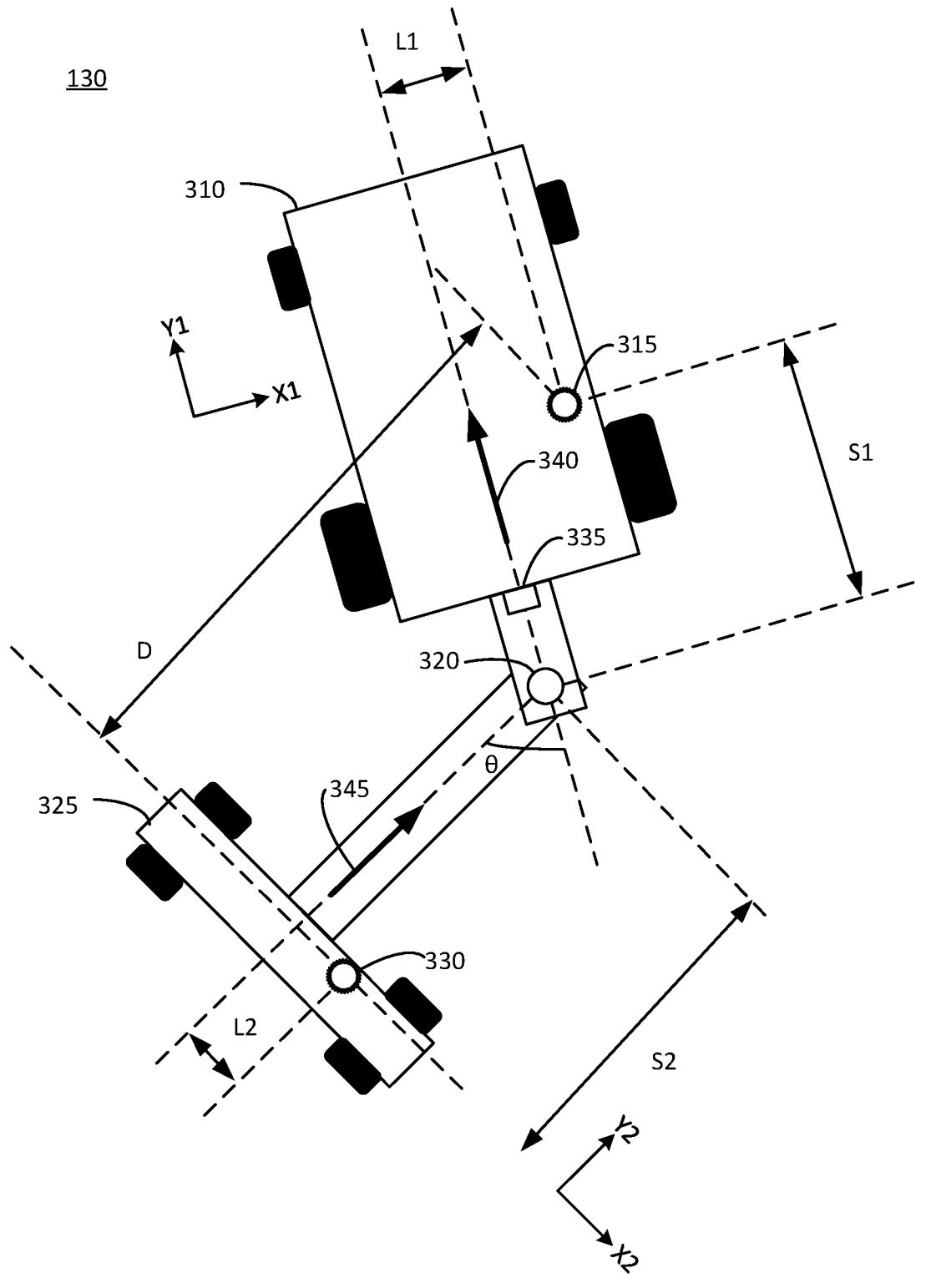
FIG. 3 illustrate a top view of a farming vehicle and an implement, according to an embodiment.

The farming machine 130 performs farming tasks in a farming area. The farming area may include leveled surfaces. The farming machine 130 receives instructions for performing the farming tasks from the farming machine management system 140 and generates control instructions for controlling components of the farming machine 130 to perform the farming tasks. An example farming machine 130 is described herein with respect to FIG. 3. The example farming machine 130 of FIG. 3 includes a vehicle 310 that is removably or statically coupled to an implement 325 via a hitch 320. The vehicle 310 may be remotely controlled, semi-autonomous, or autonomous and include a driving mechanism (e.g., a motor and drivetrain coupled to wheels)

for traversing through the farming area. The implement 325 is coupled to the rear of the vehicle 310 such that the implement 325 is dragged behind the vehicle 310. In alternative embodiments, a different type of implement 325 may be coupled to the front of the vehicle 310 or to the side of the vehicle 310, for example an implement may be a header on a combine, or any other type of implement suitable for use with a farming vehicle.

When the hitch 320 is a fixed hitch, the implement 325 is coupled to the vehicle 310 at one position (e.g., straight behind the vehicle) such that the heading of the vehicle 310 and the heading of the implement 325 are aligned. However, when the hitch 320 is a pivot hitch, the implement 325 may pivot side-to-side about the hitch 320, such that the heading of the vehicle 310 and the heading of the implement 325 are different. The term "heading" is used to refer to the orientation of the vehicle 310 or the implement 325 indicative of the future direction of motion. The heading of the vehicle 310 is represented by a first vector 340 that passes through a pivot point (e.g., where the hitch 320 connects the vehicle 310 and the implement 325) and a center of the vehicle (e.g., geometric center of the vehicle). The heading of the implement 325 is represented by a second vector 345 that passes through the center of the implement 325 (e.g., geometric center of the implement 325) and the pivot point, and the second vector 345 is at an angle θ from the first vector 340.

The vehicle 310 includes a first location sensor 315 and the implement 325 includes a second location sensor 330 that each continuously collects geolocation and time information corresponding to the motion of the vehicle 310 and the implement 325, respectively. In some embodiments the implement 235 may not include a position sensor, and the position of the implement 325 may be determined using a kinematic model. The first location sensor 315 and the second location sensor 330 may be integrated with inertial measurement units (IMU) that detects acceleration and rotational rate along pitch, roll, and yaw axes. The first location sensor 315 and the second location sensor 330 provides the collected information to the farming machine management system 140. The first location sensor 315 is positioned at a first position on the vehicle 310 that is offset from a center line through the vehicle 310 by L1 along a first lateral axis X1 and offset by S1 relative to the hitch 320 along a first vertical axis Y1. The second location sensor 330 is positioned at a second position on the implement 325 that is offset from a center line through the implement 325 by L2 along a second lateral axis X2 and offset vertically by S2 relative to the hitch 320 along a second vertical axis. The first location sensor 315 and the second location sensor 325 are at a distance D apart that can vary according to the angle θ. The distances S1, S2, L1, and L2 are fixed and may be measured by personnel associated with the farming machine management system 140 before the farming machine 130 is deployed (e.g., manufacturer of the farming machine 130, test operator of farming machine management system 140) or may be measured by a user of the farming machine (e.g., farmer) and input to the farming machine management system 140 after being deployed.

The vehicle 310 includes a camera 335 attached to the back of the vehicle 310 and directed to capture images of the implement 325 that follows behind the vehicle 310. The captured images may be provided to the farming machine management system 140 that determines the angle θ between the center line of the vehicle 310 and the center line of the implement 325. In some embodiments, the camera 335 is installed to be aligned with the center line of the vehicle 310. In other embodiments, the camera 335 is installed elsewhere on the vehicle 335. The camera 335 is calibrated to determine intrinsic parameters such as local length, skew, distortion, and image center and extrinsic parameters such as position and orientation of the camera 335 relative to the vehicle 310. In an alternative embodiment, the camera 335 may be replaced with a potentiometer or other sensors that generates signals according to the angle θ.

When guiding the farming machine 130 through a field, the farming machine management system 140 needs to determine the heading of the vehicle 310 and the heading of implement 325 as well as the position of the farming machine 130 within the field to predict the motion of the farming machine 130. In some embodiments, a GPS receiver may accurately determine the heading. One method of determining the heading is to compare the information collected by location sensors at different points in time and use the change in the positions over time to calculate the heading. This method for determining the heading can be effective when the farming machine 130 is moving at a speed above a threshold speed. However, when the farming machine 130 is moving a speed below the threshold speed, the heading determined may be inaccurate due to limits in the accuracy of location sensors, and when the farming machine 130 is stationary, the method cannot be used since there is no change in positions. Operating the farming machine 130 without accurate headings for the vehicle 310 and the implement 325 can lead to damage or dangerous situations. For example, if the vehicle 310 is stationary at a first location near a second location where another farming machine, building, or personnel is located, and the calculated heading of the vehicle 310 indicates that the vehicle 310 is pointed away from the second location, the farming machine management system 140 may cause the farming machine 130 to start moving according to the calculated heading. However, if the heading of the farming machine is actually pointed toward second location, when the farming machine 130 begins to move, the vehicle 310 can unexpectedly end up at the second location and lead to an accident.

To determine accurate headings for the vehicle 310 and the implement 325, the farming machine management system 140 receives location information from the first location sensor 315 and the second location sensor 330, and uses images of the implement captured by the camera 335 to determined where the pivot point of the hitch 320 is located. Based on the determined pivot point, the farming machine management system 140 determines the headings of the farming machine 130 (e.g., heading of the vehicle 310, heading of the implement 325). The farming machine management system 140 may generate instructions for operating the farming machine 130. For example, the farming machine management system 140 may generate and transmit paths for the farming machine 130 to take or instructions to adjust the headings of the farming machine 130. The farming machine management system 140 may use the determined location of the implement 325 to determine when to raise the implement when entering a headland adjacent to a field, as well as when to lower the implement when entering the field from the headland. Details on the farming machine management system 140 are further described below with respect to FIG. 2.

Figure 2:
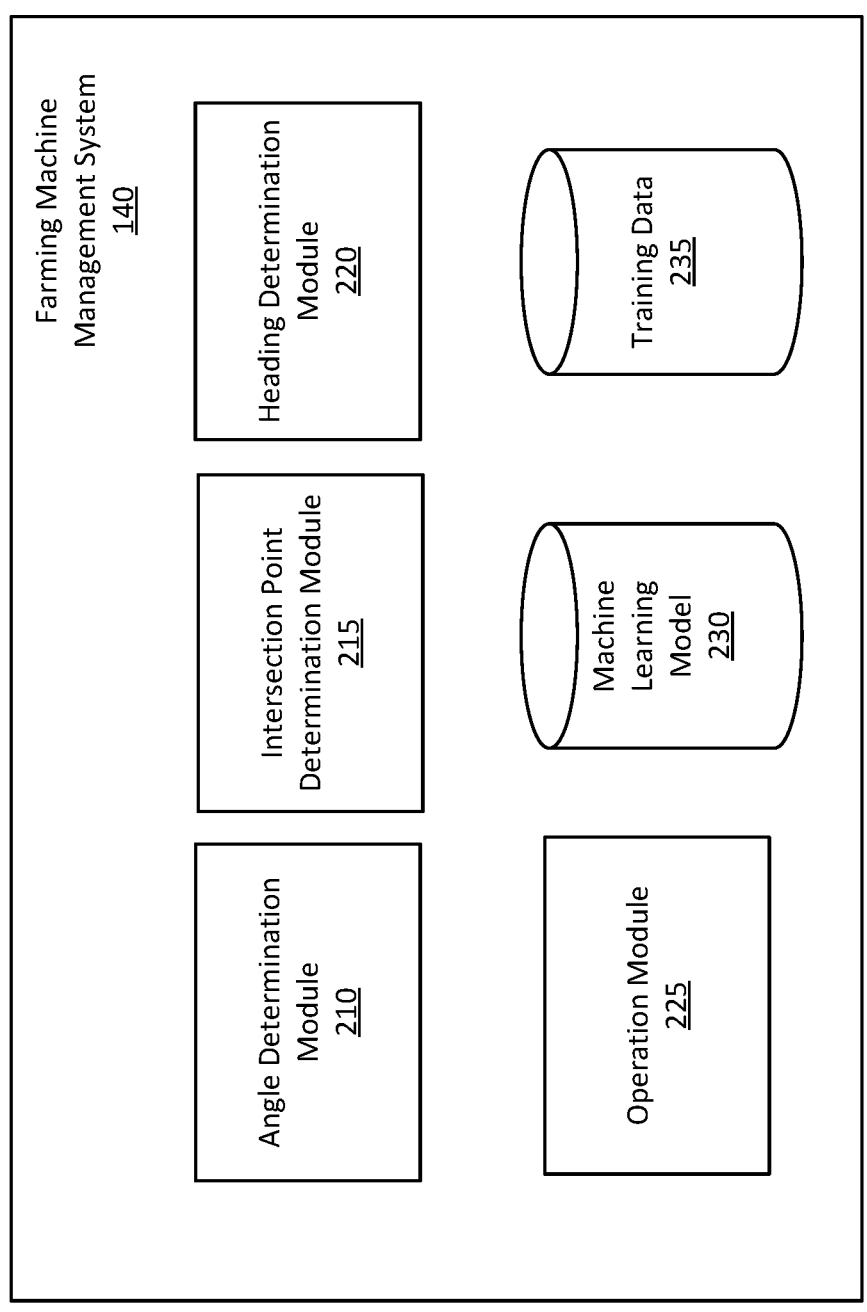
FIG. 2 illustrates a block diagram of modules and databases used by a farming machine management system, according to an embodiment.

FIG. 2 illustrates a block diagram of modules and databases used by a farming machine management system, according to an embodiment. The farming machine management system 140 includes an angle determination module 210, an intersection point determination module 215, a heading determination module 220, an operation module

225, a machine learning model database 230, and a training data database 235. The modules and databases depicted in FIG. 2 are merely exemplary; more of fewer modules and/or databases may be used by the action recommendation system 130 in order to achieve the functionality described herein. Moreover, these modules and/or databases may be located in a single server, or may be distributed across multiple servers. Some functionalities of the farming machine management system 140 may be performed by the farming machine 130.

The angle determination module 210 processes an image of the implement 325 captured by the camera 335 to determine the angle θ between the vehicle 310 and the implement 325. In some embodiments, the angle determination module 210 may also modify the image (e.g., resizing, delayering, cropping, value normalization and adjusting image qualities such as contrast, brightness, exposure, temperature). The angle determination module 210 receives the image from the camera 335 and applies a machine learning model 230 to performing image recognition to identify the portion of the image including pixels that represent the implement 325 and determine the angle θ between the center line of the vehicle 310 and the center line of the implement 325. In some embodiments, the machine learning model 230 is a supervised model that is trained to output the angle θ for an input image. The machine learning model 230 may be a neural network, decision tree, or other type of computer model, and any combination thereof. Training data 235 for the machine learning model 230 may include training images of historical implements captured by cameras 335 installed on various historical farming machines 130. Each training image may be labeled to include a bounding box around at least a portion of the historical implement 325. The bounding box may be drawn by a human annotator to include the portion of the image including the historical implement 325. In some embodiments, there may be one or more fiducial markers at known locations on each historical implement 325 (e.g., along the center line of the implement 325), and a human annotator may place a bounding box around the fiducial marker.

For each training image, the intrinsic parameters such as local length, skew, distortion, and image center and extrinsic parameters such as position and orientation of the camera 335 that captured the training image are known. Based on these camera parameters and the position of the bounding box within the training image, the direction of the historical implement 325 and the angle θ can be determined. In one example, the camera 335 may be calibrated such that the center of the training image corresponds to the center line of the vehicle 310. In this example, the implement 325 is determined to be positioned to the right of the vehicle 310 if the bounding box lies to the right of the image center and determined to be positioned to the left if the bounding box lies to the left of the image center. The angle θ can be calculated between the image center and a centerline of the implement 325 in the bounding box. The angle θ associated with the training image are also included for training the machine learning model 230. Each training image may be associated with additional information and the additional information are provided along with the training image. The additional information include the dimensions of the historical vehicle 310 and/or the historical implement 325, intrinsic and/or extrinsic parameters of the corresponding camera 335, and other relevant features regarding the configuration of the historical farming machine 130. Dimensions of the historical vehicle 310 may include length, width, height of the historical vehicle 310, a distance between the first location sensor and the center line of the historical vehicle 310 (e.g., L1 in feet.), a distance between the first location sensor and the hitch 320 (e.g., S1 in feet), and dimensions of the implement 325 may include length, width, height of the historical vehicle 310, a distance between the second location sensor and the center line of the implement 325 (e.g., S2 in feet), and a distance between the second location sensor and the hitch 320 (e.g., L2 in feet).

In an alternative embodiment, instead of the camera 335, a potentiometer or another type of sensor is installed at the hitch 320 to determine the angle θ between the vehicle 310 and the implement 325. The potentiometer generates a voltage value according to the angle θ. The relationship between voltage values and the angle θ between the vehicle 310 and the implement 325 may be predetermined such that voltage value generated by the potentiometer can be mapped to an angle θ.

Figures 4A, 4B:
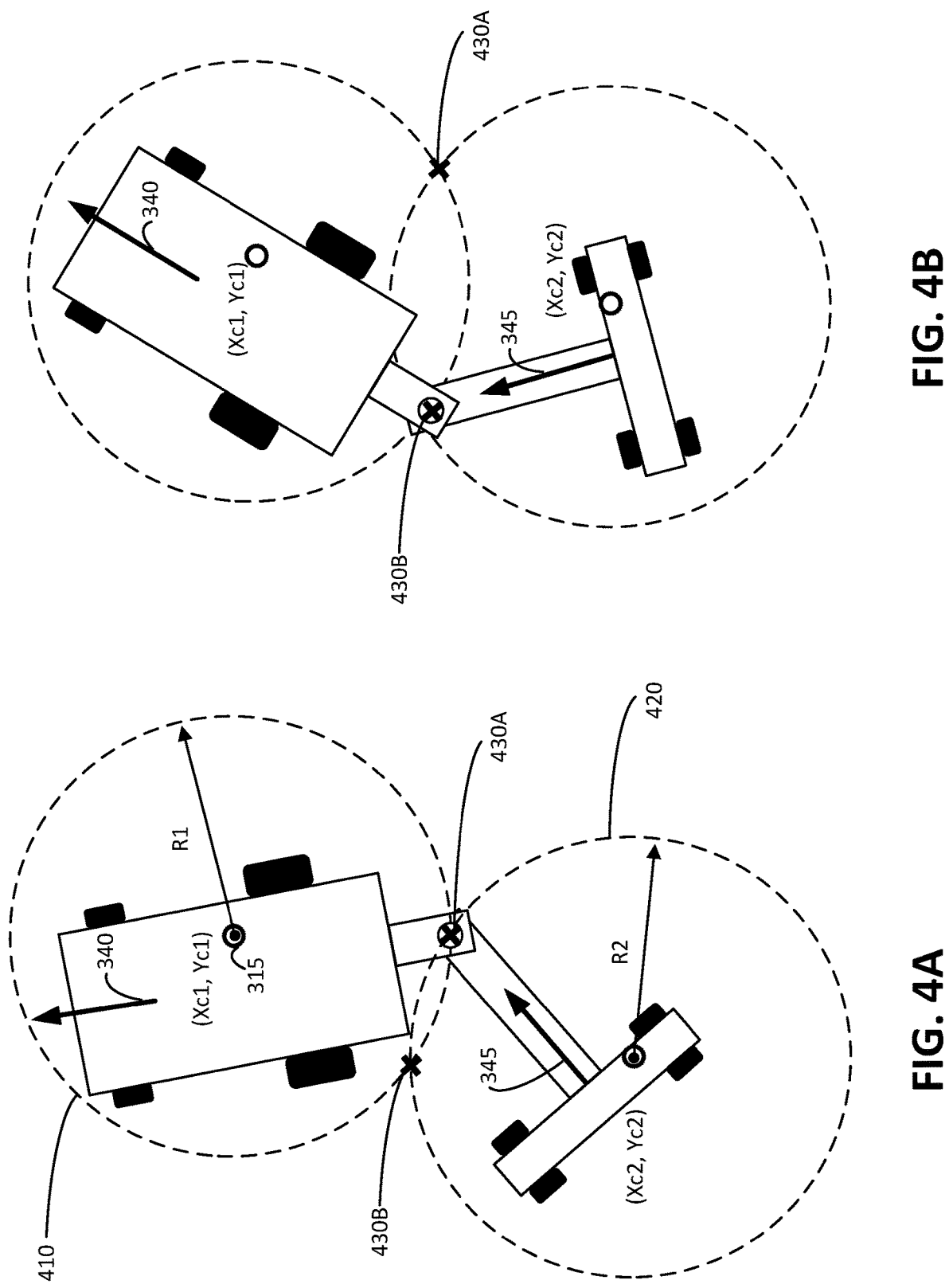
FIG. 4A illustrates a top view of a farming vehicle and an implement with a pivot point at a first intersection point of two circles, according to an embodiment.
FIG. 4B illustrates a top view of a farming vehicle and an implement with a pivot point at a second intersection point of two circles, according to an embodiment.

The intersection point determination module 215 determines the pivot point where the hitch 320 is located. As illustrated in FIGS. 4A and 4B showing top views of a farming machine 130, when the first location sensor 315 reads a first set of coordinates (Xc1, Yc1) and the second location sensor 330 reads a second set of coordinates (Xc2, Yc2), there can be two possible headings for the vehicle 310 and the implement 325. Coordinates may be represented in geocentric coordinates, map coordinates, or spherical coordinate system. The intersection point determination module 215 identifies one or more intersection points between a first circle 410 centered at the first location sensor 315 and a second circle 420 centered at the second location sensor 330. The first circle 410 has a first radius R1 that corresponds to a distance between a position of the first location sensor 315 and the hitch 320, and the second circle 420 has a second radius R2 that corresponds to a distance between a position of the second location sensor 315 and the hitch 320.

Depending on where the first set of coordinates (Xc1, Yc1) and the second set of coordinates (Xc2, Yc2) are, there can be one intersection point or two possible intersection points between the first circle 410 and the second circle 420. For the first set of coordinates (Xc1, Yc1) and the second set of coordinates (Xc2, Yc2) in FIGS. 4A and 4B, there are two possible intersection points. In the first configuration shown in FIG. 4A, the hitch 320 is at a first intersection point 430A, and in the second configuration shown in FIG. 4B, the hitch 320 is at a second intersection point 430B. Coordinates of the first intersection point 430A and the second intersection point 430B can be calculated using the following equations:

$$(X-Xc1)^2+(Y-Yc1)^2=R1^2 \qquad \text{(Equation 1)}$$

$$(X-Xc2)^2+(Y-Yc2)^2=R2^2 \qquad \text{(Equation 2)}$$

$$\sqrt{S1^2+L1^2}=R1 \qquad \text{(Equation 3)}$$

$$\sqrt{S2^2+L2^2}=R2 \qquad \text{(Equation 4)}$$

The values of (Xc1, Yc1) and (Xc2, Yc2) are provided by the first location sensor 315 and the second location sensor 330, respectively. S1, L1, S2, and L2 are known distances. Using equations 1-4, up to two possible solutions for X and Y can be calculated. Therefore, the coordinates of the first intersection point 430A and the second intersection point 430B represented by (X, Y) can be determined.

Figure 4C:
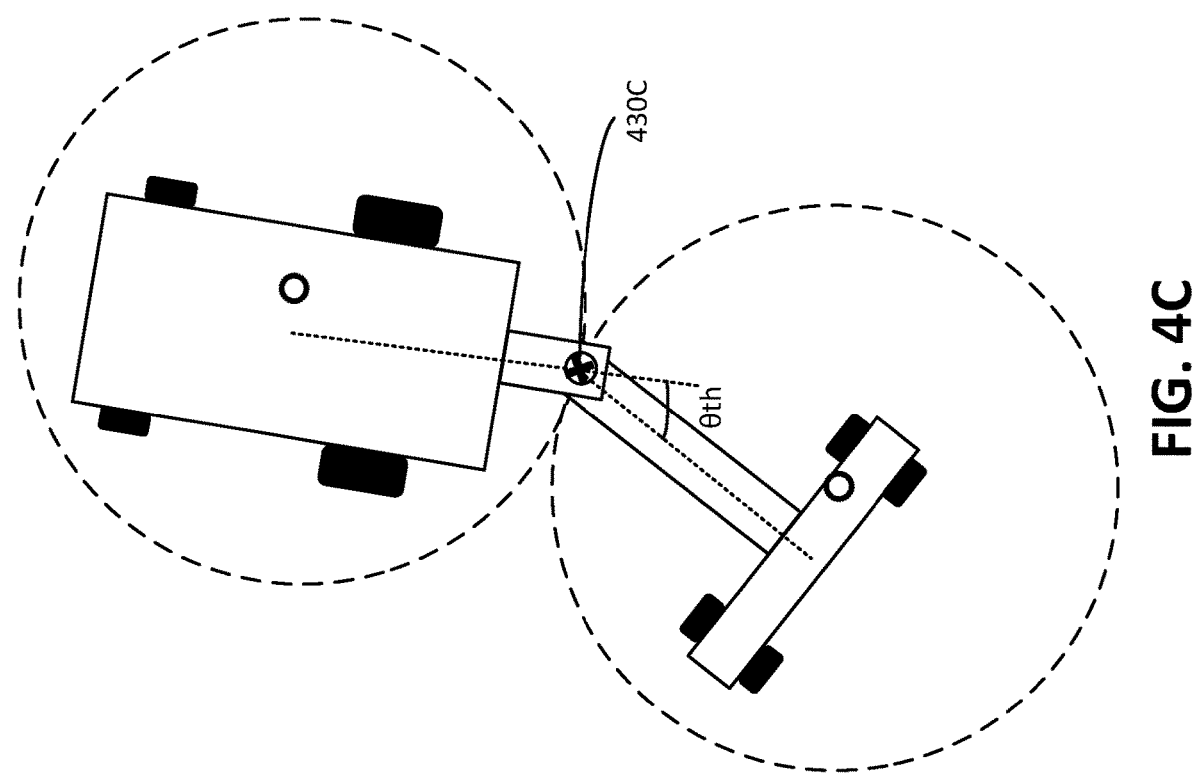
FIG. 4C illustrates a top view of a farming vehicle and an implement with a pivot point at a third intersection point of two circles, according to an embodiment.

After determining the coordinates of the first intersection point 430A and the second intersection point 430B, the intersection point determination module 215 selects one of the first intersection point 430A and the second intersection point 430B based on the angle of the implement 325 determined by the angle determination module 210. The intersection point determination module 215 identifies a threshold angle θth associated with the farming machine 130 given its dimensions. As illustrated in FIG. 4C, the threshold angle θth corresponds to the angle between the center line of the vehicle 310 and the center line of the implement 325 when the farming machine 130 is oriented such that the first circle 410 and the second circle 420 have exactly one intersection point 430C. The threshold angle θth of a farming machine 130 depends on offsets L1, L2, S1, and S2. The intersection point determination module 215 compares the angle θ determined by the angle determination module 210 to the threshold angle θth. For example, when the angle θ is less than the threshold angle θth, the intersection point determination module 215 determines that the hitch 320 is at the first intersection point 430A. When the angle θ is greater than the threshold angle θth, the intersection point determination module 215 determines that the hitch 320 is at the second intersection point 430B. When the angle θ is equal to the threshold angle θth, the intersection point determination module 215 determines that the hitch 320 is at the third intersection point 430C.

The heading determination module 220 determines the heading of the vehicle 310 and the heading of the implement 325 based on the intersection point. The heading determination module 220 determines the first vector 340 between the center point of the vehicle 310 and the intersection point representing the heading of the vehicle 310 and the first location sensor 315 and determines the second vector 345 between the second location sensor 330 and the intersection point representing the heading of the implement 325.

In some embodiments, the headings of the farming machine 130 are determined using the intersection point whenever the first location sensor 330 and the second location sensor 315 receive new location data (e.g., set of coordinates). In some embodiments, when the farming machine 130 is moving at a speed greater than a threshold speed, the headings of the farming machine 130 can accurately be determined using just location data collected by the first location sensor 330 and the second location sensor 315 over time, so the headings of the farming machine 130 may not be determined using the intersection point to save computational resources. In some embodiments, the headings of the farming machine 130 are determined using both methods and the results of the two methods are compared. If the results are different by more than a threshold amount, the farming machine management system 140 may generate and send a notification to the client device 110 associated with the farming machine 130 indicating that the farming machine 130 require examination. For example, the camera 335, the first location sensor 315, or the second location sensor 315 may not be functioning properly, the camera 335 may require recalibration, or the dimensions of the farming machine 130 (e.g., L1, L2, S1, S2) may need to be remeasured.

The operation module 225 generates instructions for operating the farming machine 130 based on the location and heading of the vehicle 310 and the location and heading of the implement 325. The operation module 225 generates the instructions to cause the farming machine 130 to perform an action. In some embodiments, the farming machine 130 may be semi-autonomous or autonomous. The operation module 225 may determine a path for the farming machine 130 to take based on the headings of the farming machine 130 and cause the farming machine 130 to move along the path. In other embodiments, the farming machine 130 may be remotely controlled based on input from a human operator (e.g., farmer) via the client device 110. The farming machine management system 140 may generate and present a user interface that includes a map of a field including a graphical element representing the farming machine 130 to the human operator. The graphical element may be positioned according to the heading of the vehicle 310 and the heading of the implement 325 such that the human operator may operate the farming machine 130 accurately and safely.

In some embodiments, the operation module 225 generates instructions to cause the farming machine 130 to raise or lower the implement 325. The operation module 225 may determine a lowering duration that it takes to lower the implement 325 from a raised position to a lowered position. While the farming machine 130 is operating on the field, it may be desirable for the implement 325 to be in the lowered position. However, while the farming machine 130 is located in the headland where the farming machine 130 turns around, it may be desirable for the implement 325 to be in the raised position. As the farming machine 130 enters the headland, the operation module 225 may determine that the entirety of the implement 325 is located within the headland, and the operation module 225 may instruct the farming machine 130 to begin raising the implement 325. The operation module 225 may instruct the farming machine 130 to begin lowering the implement 325 based on the determined lowering duration such that the implement is fully lowered prior to any portion of the implement leaving the headland.

FIG. 5 illustrates a flowchart of a method for determining heading of a farming vehicle and an implement, according to an embodiment. Process 500 begins with the farming machine management system 140 receiving 510 a first set of coordinates from a first location sensor (e.g., first location sensor 315) coupled to a vehicle (e.g., vehicle 310 of farming machine 130) at a first point. The farming machine management system 140 also receives 515 a second set of coordinates from a second location sensor (e.g., second location sensor 330) coupled to an implement (e.g., implement 325) at a second point. The implement is coupled to the vehicle at a pivot point and configured to move about the pivot point such that a first heading of the vehicle and a second heading of the implement may be different. The farming machine management system 140 identifies 520 one or more intersection points (e.g., intersection points 430A, 430B, 430C) between a first circle (e.g., first circle 410) centered at the first point and a second circle (e.g., second circle 420) centered at the second point. The first circle has a first radius corresponding to a distance between the first point where the first location sensor is and the pivot point, and the second circle has a second radius corresponding to a distance between a second point where the second location sensor is and the pivot point. The farming machine management system 140 selects 525 one intersection point from the one or more intersection points based on a relative angle between the vehicle and the implement based on the selected intersection point. The farming machine management system 140 generates instructions based on the first heading and the second heading to cause the vehicle to perform an action.

Figure 6:
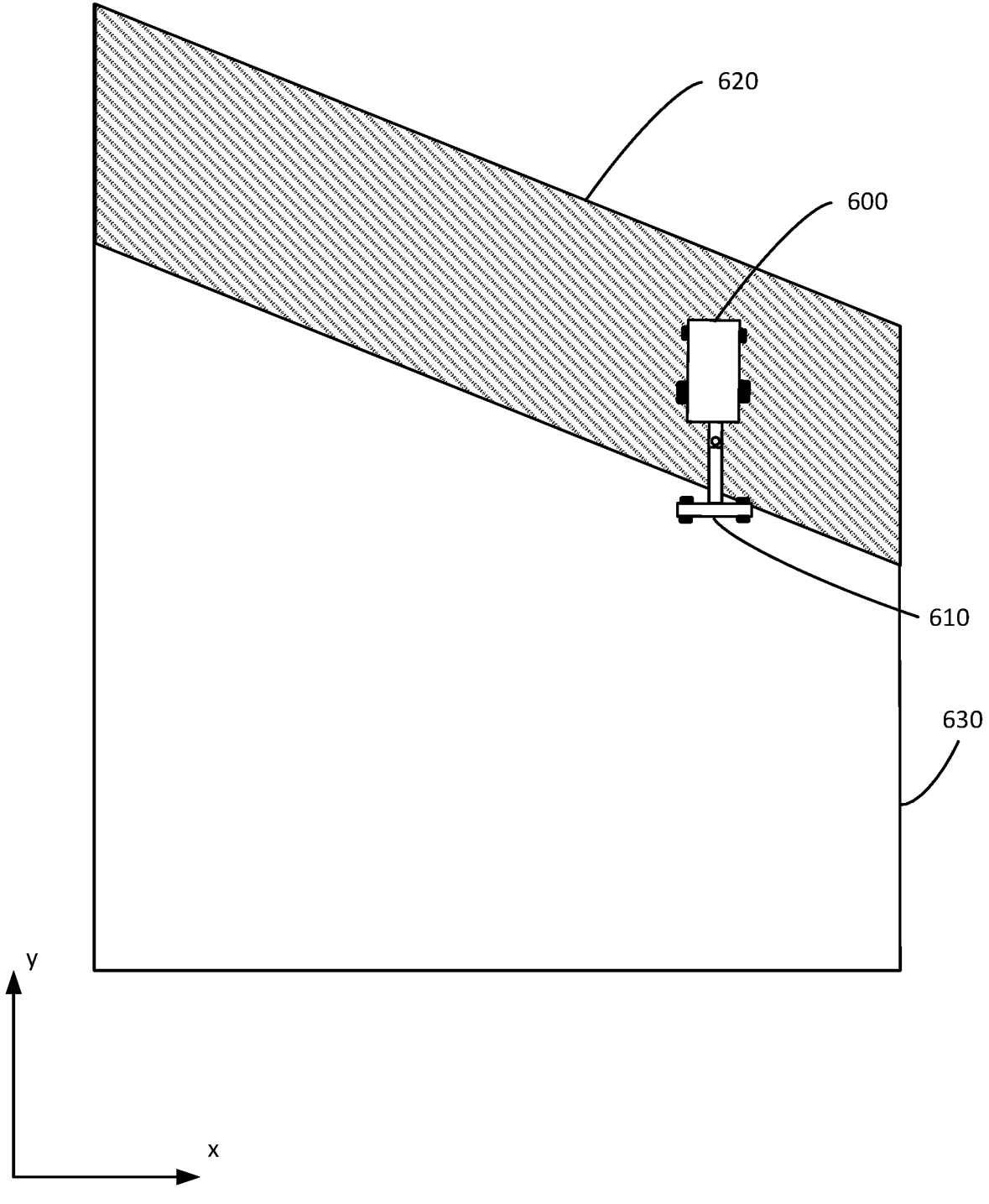
FIG. 6 illustrates a top view of a farming vehicle and an implement entering a headland, according to an embodiment.

FIG. 6 illustrates a top view of a farming vehicle 600 and an implement 610 entering a headland 620, according to an embodiment. The location of the headland 620 may be determined in various ways. For example, the headland 620 may be determined by a coverage map that has been generated based on the farming vehicle 600 working the headland 620 prior to working the field 630. In some embodiments, the headland 620 may be determined based on an offset from the field boundary, and the farming vehicle 600 may work the headland 620 after working the field 630. The farming vehicle 600 is traveling in the positive y-direction as shown. The implement 610 is operating on the field 630. For example, the implement 610 may be tilling, planting seeds, treating plants, or performing any other suitable operation of the field 630. The implement 610 is showed crossing into the headland 620. Different portions of the implement 610 may enter the headland 620 at different times. For example, in the illustrated embodiment, the farming vehicle 600 and implement 610 enter the headland 620 at a non-perpendicular angle relative to the border between the headland 620 and the field 630. In other embodiments, the border may be curved or at any other angle relative to the path of the implement 610. The farming vehicle 600 may determine the position of the implement 610 with respect to the border between the headland 620 and the field 630. Once the farming vehicle 600 determines that the implement 600 is fully within the headland 620, the farming vehicle 600 may automatically raise the implement 600 above the ground. The farming vehicle 600 may turn around in the headland and return into the field 630 to operate on the field 630 in the negative y-direction, as described with reference to FIG. 7.

Figure 7:
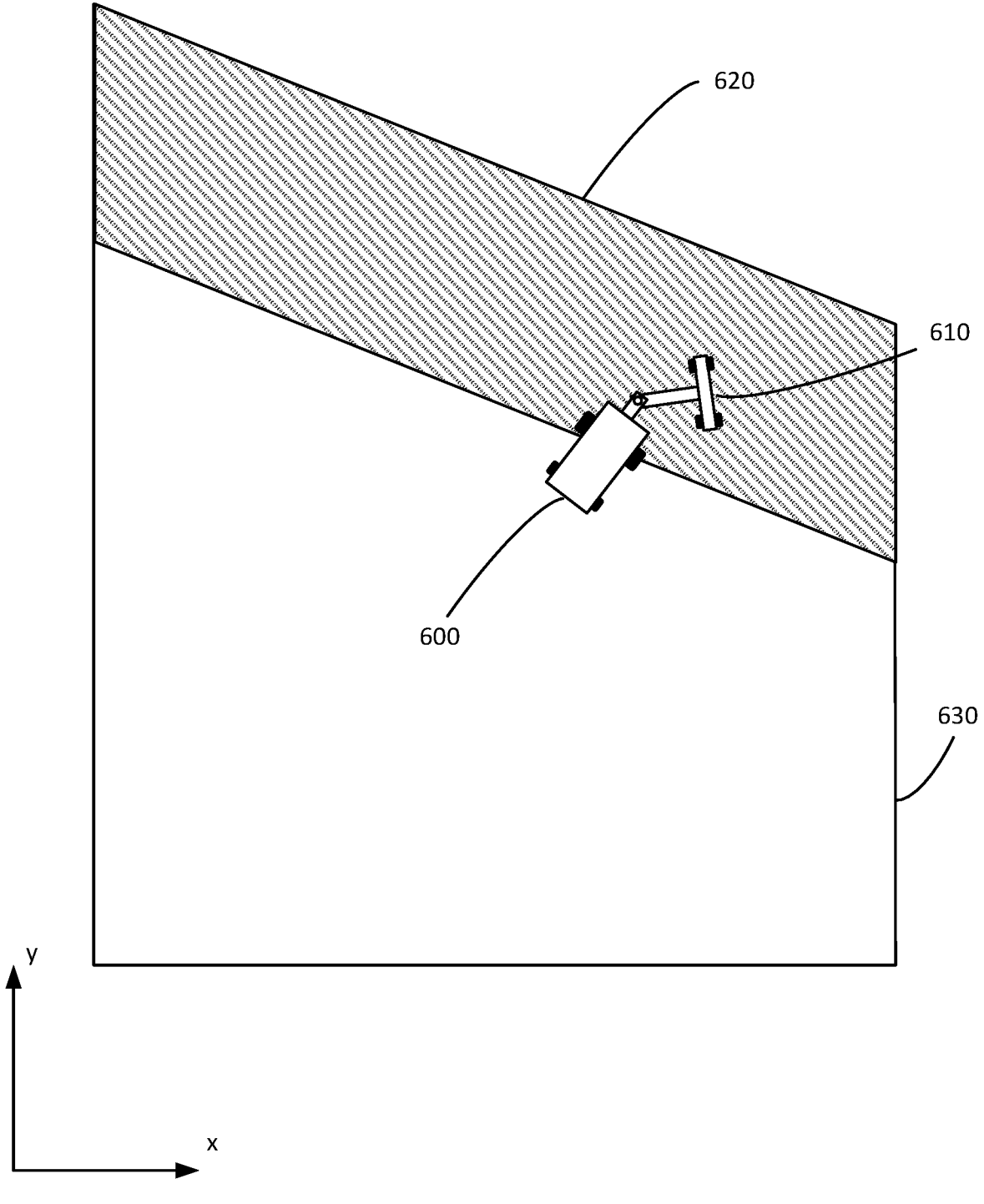
FIG. 7 illustrates a top view of a farming vehicle and an implement exiting a headland, according to an embodiment.

FIG. 7 illustrates a top view of the farming vehicle 600 and the implement 610 exiting the headland 620, according to an embodiment. The farming vehicle 600 may determine an amount of time it will take to lower the implement 610 to begin operating on the field 630. The farming vehicle 600 may also determine an amount of time until the implement 610 will begin to cross the border between the headland 620 and the field 630. For example, based on a programmed route, a current position of the farming vehicle 600 and implement 610, and a current speed of the farming vehicle, the farming vehicle 600 may calculate the amount of time until the implement 610 will begin to enter the field 630. The farming vehicle 600 may begin lowering the implement 610 at a time such that the implement 610 begins operating on the field 630 once a portion of the implement 610 crosses the border between the headland 620 and the field 630. For example, the farming vehicle 600 may determine that it will take two seconds to lower the implement 610, and the farming vehicle 600 may begin lowering the implement 610 two seconds prior to a predicted time that any portion of the implement 610 enters the field 630.

Figure 8:
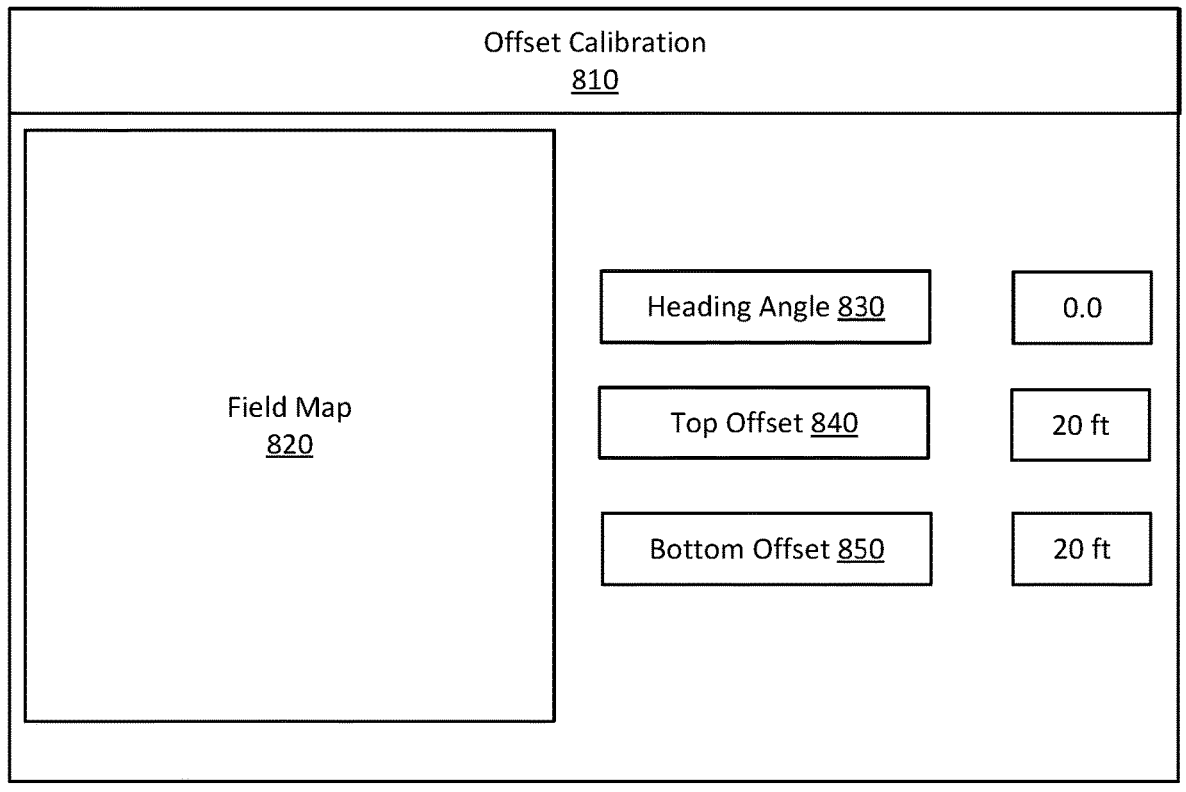
FIG. 8 illustrates a screenshot of a control interface for controlling a farming vehicle, according to an embodiment.

FIG. 8 illustrates a screenshot of a control interface 800 for offset calibration 810, according to an embodiment. The control interface 800 may comprise a field map 820 that displays the field, the headland, and the position of the farming vehicle 600. The control interface 800 may permit a user to adjust when the farming vehicle 600 begins to raise or lower the implement 610. For example, the farming vehicle 600 may be traversing the field in rows going from top to bottom across the field map 820. The user may determine that the implement is being lowered too late by approximately twenty feet when entering the field from the headland. The control interface 800 may comprise a top offset field 840 where the user may input an offset from the border between the headland and the field such that the farming vehicle 600 lowers the implement twenty feet sooner. Similarly, the control interface 800 may comprise a bottom offset field 850 to calibrate the bottom offset. The control interface 800 may further comprise a heading angle 830 field to allow a user to calibrate the heading angle followed by the farming vehicle 600.

FIG. 9 illustrates a flowchart of a method 900 for automatically raising and lowering an implement for a farming vehicle, according to an embodiment. A farming vehicle may determine 910 an operating path for the farming vehicle on a field. In some embodiments, the farming vehicle may automatically determine the operating path based on known dimensions of the field. In some embodiments, a user may input an operating path into a control interface for the farming vehicle. The operating path may cover all or a portion of the field. The operating path may additionally cover a portion of a headland where the farming vehicle may turn around.

The farming vehicle may determine 920 a lowering duration to lower an implement. The farming vehicle may lower the implement from a raised position to a lowered position. The farming vehicle may measure the time it took to lower the implement to the lowered position. In some embodiments, the implement may comprise one or more sensors, such as a depth sensor, that indicates when the implement has reached the appropriate lowered position. In some embodiments, the farming vehicle may monitor the duration of oil flowing through a selective control valve (SCV) that controls the height of the implement. In some embodiments, a user may instruct the farming vehicle to start and/or stop lowering the implement, and the farming vehicle may measure the time between inputs. In some embodiments, the farming vehicle may instruct a user to raise and lower the implement one or more times prior to beginning the operating path to time the duration of raising and lowering the implement. In some embodiments, the farming vehicle may time the duration to lower the implement the first time as the farming vehicle begins the operating path. The farming vehicle may lower the implement and proceed on the operating path.

The farming vehicle may raise 930 the implement once the implement is fully located within the headland for the field. The farming vehicle may determine the position of the implement with respect to the border between the headland and the field. In some embodiments, the farming vehicle may cross the border at an angle non-perpendicular to the border. In such cases, different portions of the implement may enter the headland at different times. The farming vehicle may determine that the entire implement has entered the headland. Once the farming vehicle determines that the implement is fully within the headland, the farming vehicle may automatically raise the implement above the ground. The farming vehicle may turn around in the headland and return into the field to continue on the operating path.

The farming vehicle may calculate 940 a time at which a portion of the implement will exit the headland and enter the field. For example, based on the operating path, a current position of the farming vehicle and implement, and a current speed of the farming vehicle, the farming vehicle may calculate the amount of time until the implement begins to enter the field. In some embodiments, the farming vehicle may continuously calculate the amount of time until the implement begins to enter the field. The farming vehicle may recalculate the time in response to a change in any parameters. For example, in response to the user adjusting the speed of the farming vehicle or the flow rate of oil through the SCV, the farming vehicle may recalculate the time until the implement begins to enter the field. In some embodiments, if the farming vehicle detects a change in speed of the farming vehicle after beginning to lower the implement, the farming vehicle may adjust the flow rate to the SCV to compensate for the difference in speed of the farming vehicle.

In some embodiments, the farming vehicle may calculate the time at with the implement will enter the field based on a prescribed speed. For example, the farming vehicle may traverse the field at a first speed, and the farming vehicle may turn in the headland at a second speed which may be different than the first speed. The path and the speed of the farming vehicle may be preplanned. The farming vehicle may calculate the time at which the implement will enter the field based on the distance to be traveled in the headland and the prescribed second speed. In response to the operator varying the speed of the farming vehicle from the prescribed speed, the farming vehicle may recalculate the time to raise or lower the implement based on the current speed. In embodiments where the operator is driving or turning manually, the farming vehicle may calculate estimated times by assuming that the path across the field and through the turn may be adjacent to the previous path and turn conducted by the farming vehicle.

The farming vehicle may lower 950 the implement prior to entering the field. For example, based on the previously calculated lowering duration, the farming vehicle may determine that it will take two seconds to lower the implement, and the farming vehicle may begin lowering the implement two seconds prior to the predicted time that any portion of the implement enters the field. The farming vehicle may when the calculated time is equal to or within a threshold time of the determined lowering duration. For example, if the threshold time is 0.5 seconds and the lowering duration is two seconds, the farming vehicle may begin lowering the implement 2.5 seconds prior to time at which the implement is predicted to enter the field. The farming vehicle may track the point at which the implement is fully lowered to document areas of the field that have been operated on by the implement. The farming vehicle may proceed on the operating path.

The farming vehicle may adjust 960 the offset for the implement based on user input. In some embodiments, the user may choose not to adjust the offset. In some embodiments, the user may determine that the farming vehicle is raising or lowering the implement too early or too late, and the user may adjust the offset such that the farming vehicle raises or lowers the implement earlier or later based on the user's input. For example, the user may instruct the farming vehicle to begin lowering the implement twenty feet earlier than the farming vehicle did on previous turns. In some embodiments, the farming vehicle may adjust the offset, recalculate the lowering duration, or adjust any other suitable parameter in response to a change in conditions, such as a change in operating condition of the vehicle or a change in weather conditions which affects the timing or speed of the farming vehicle in any relevant manner.

Additional Configuration Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory.

An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for automating the raising and lowering of implements for farming vehicles. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   determining an operating path for a farming vehicle on a field;
   determining automatically a lowering duration to lower an implement of the farming vehicle, wherein the lowering duration is based on a time it takes for the implement to move from a raised position to a lowered position;
   raising automatically the implement in response to the implement being fully located within a headland for the field;
   calculating a time at which the implement will exit the headland and enter the field based on the determined operating path for the farming vehicle;
   determining a trigger time point based on the calculated time and the determined lowering duration, wherein the trigger time point corresponds to a time that is offset from the calculated time by the lowering duration; and
   in response to arrival of the trigger time point, lowering automatically the implement such that the implement reaches the lowered position at or near the calculated time of the implement's entry into the field.

2. The method of claim 1, further comprising adjusting, based on input from a user, an offset for the implement.

3. The method of claim 1, wherein determining the lowering duration further comprises measuring a time based on a flow of oil through a selective control valve.

4. The method of claim 1, further comprising lowering automatically the implement prior to the trigger time point.

5. The method of claim 1, further comprising:
   detecting a change in speed of the farming vehicle;

recalculating the time at which the implement will exit the headland; and redetermining the trigger time point based on the recalculated time.

6. The method of claim 1, further comprising:

during the lowering of the implement, changing a flow rate of oil to a selective control valve in response to a change in speed of the farming vehicle.

7. A non-transitory computer-readable storage medium comprising computer program instructions that, when executed by a computer processor, cause the processor to perform operations to:

determine an operating path for a farming vehicle on a field;

determine automatically a lowering duration to lower an implement of the farming vehicle, wherein the lowering duration is based on a time it takes for the implement to move from a raised position to a lowered position;

raise automatically the implement in response to the implement being fully located within a headland for the field;

calculate a time at which the implement will exit the headland and enter the field based on the determined operating path for the farming vehicle;

determine a trigger time point based on the calculated time and the determined lowering duration, wherein the trigger time point corresponds to a time that is offset from the calculated time by the lowering duration; and in response to arrival of the trigger time point, lower automatically the implement such that the implement reaches the lowered position at or near the calculated time of the implement's entry into the field.

8. The non-transitory computer-readable storage medium of claim 7, wherein the instructions further cause the processor to adjust, based on input from a user, an offset for the implement.

9. The non-transitory computer-readable storage medium of claim 7, wherein determining the lowering duration further comprises measuring a time based on a flow of oil through a selective control valve.

10. The non-transitory computer-readable storage medium of claim 7, wherein the instructions further cause the processor to lower automatically the implement prior to the trigger time point.

11. The non-transitory computer-readable storage medium of claim 7, wherein the instructions further cause the processor to:

detect a change in speed of the farming vehicle;

recalculate the time at which the implement will exit the headland; and redetermine the trigger time point based on the recalculated time.

12. The non-transitory computer-readable storage medium of claim 7, wherein the instructions further cause the processor:

during the lowering of the implement, change a flow rate of oil to a selective control valve in response to a change in speed of the farming vehicle.

13. A system comprising:

one or more processors; and a non-transitory computer-readable medium comprising computer program instructions that, when executed by the one or more processors, cause the one or more processors to perform operations comprising:

determining an operating path for a farming vehicle on a field;

determining automatically a lowering duration to lower an implement of the farming vehicle, wherein the lowering duration is based on a time it takes for the implement to move from a raised position to a lowered position;

raising automatically the implement in response to the implement being fully located within a headland for the field;

calculating a time at which the implement will exit the headland and enter the field based on the determined operating path for the farming vehicle;

determining a trigger time point based on the calculated time and the determined lowering duration, wherein trigger time point corresponds to a time that is offset from the calculated time by the lowering duration; and in response to arrival of the trigger time point, lowering automatically the implement such that the implement reaches the lowered position at or near the calculated time of the implement's entry into the field.

14. The system of claim 13, wherein the operations further comprise adjusting, based on input from a user, an offset for the implement.

15. The system of claim 13, wherein determining the lowering duration further comprises measuring a time based on a flow of oil through a selective control valve.

16. The system of claim 13, wherein the operations further comprise lowering automatically the implement prior to the trigger time point.

17. The system of claim 13, wherein the operations further comprise:

detecting a change in speed of the farming vehicle;

recalculating the time at which the implement will exit the headland; and redetermining the trigger time point based on the recalculated time.

* * * * *